(12) United States Patent
Yumoto et al.

(10) Patent No.: US 7,954,069 B2
(45) Date of Patent: May 31, 2011

(54) MICROSCOPIC-MEASUREMENT APPARATUS

(75) Inventors: Masaaki Yumoto, Hachioji (JP); Kenichi Akao, Hachioji (JP); Yoshiko Akao, Hachioji (JP); Jun Koshoubu, Hachioji (JP)

(73) Assignee: JASCO Corporation, Hachioji-shi, Tokyo (JP)

( * ) Notice: Subject to any disclaimer, the term of this patent is extended or adjusted under 35 U.S.C. 154(b) by 529 days.

(21) Appl. No.: 12/117,252

(22) Filed: May 8, 2008

(65) Prior Publication Data

US 2008/0282197 A1 Nov. 13, 2008

(30) Foreign Application Priority Data

May 10, 2007 (JP) ................... 2007-125849

(51) Int. Cl.
*G06F 15/00* (2006.01)
*G06F 13/00* (2006.01)
(52) U.S. Cl. ........................ 715/838; 715/837
(58) Field of Classification Search .................. 715/744, 715/243, 230, 273, 700, 780, 835–839, 763–765, 715/715
See application file for complete search history.

(56) References Cited

U.S. PATENT DOCUMENTS

2006/0133657 A1* 6/2006 Schmid et al. ................ 382/128
2006/0188137 A1* 8/2006 Bacus et al. .................. 382/128

FOREIGN PATENT DOCUMENTS

| EP | 0994433 A1 | 4/2000 |
|----|------------|--------|
| WO | 98/39728 | 9/1998 |
| WO | 01/84209 A2 | 11/2001 |
| WO | 02/37159 A3 | 5/2002 |

OTHER PUBLICATIONS

Japanese patent abstract; Microscopic Image Mapping Device and Method; Publication No. 04-194905; Publication date Jul. 14, 1992.
Japanese patent abstract; Microscope System; Publication No. 05-241075; Publication date Sep. 21, 1993.
Japanese patent abstract; Microscopic Examination Assisting Device; Publication No. 06-118307; Publication date Apr. 28, 1994.
European Search Report for corresponding EP Application No. 08155925.4 dated Jun. 10, 2009, nine pages.

* cited by examiner

*Primary Examiner* — Cao "Kevin" Nguyen
(74) *Attorney, Agent, or Firm* — Rankin, Hill & Clark LLP

(57) ABSTRACT

A microscopic-measurement apparatus capable of displaying, on a display device, an enlarged view of a particular part of a specimen placed on a movable stage and providing optical information of a desired portion includes an observation-image display section for displaying an enlarged view of a specific part of the specimen on the display device; a thumbnail-image display section for acquiring the enlarged image of the specific part as a thumbnail image when the enlarged observation image is specified and displaying the thumbnail image together with the enlarged image on the display device; a thumbnail-coordinate storage section for storing coordinate information of the specific part, where the thumbnail image is acquired, in association with the thumbnail image; and a thumbnail jump display section for causing the observation-image display section to display an enlarged image of the position of the thumbnail image by specifying the thumbnail image.

8 Claims, 2 Drawing Sheets

MICROSCOPIC-MEASUREMENT APPARATUS

BACKGROUND OF THE INVENTION

1. Field of the Invention

The present invention relates to microscopic-measurement apparatuses, and more specifically, to an improvement of a section for identifying a site to be observed or measured on a specimen.

2. Description of the Related Art

A variety of microscopes have been used to observe microscopic parts on specimens. Microscopic-measurement apparatuses have also been used widely in spectroscopic analyses and the like of microscopic parts of specimens.

As the data processing capabilities of computers have improved, the use of direct visual observation through eyepieces of microscopes has decreased, whereas it has become more common to take an image into a computer and display an enlarged image on its display device. In addition, a technology has been developed to control a movable stage of the microscope with a computer to perform continuous spectroscopic analysis of a plurality of parts in one session. These technologies are disclosed, for example, in Japanese Unexamined Patent Application Publication No. Hei-4-194905, Japanese Unexamined Patent Application Publication No. Hei-5-241075, and Japanese Unexamined Patent Application Publication No. Hei-6-118307.

An automatic apparatus of that type would make it possible to conduct spectroscopic analyses, which used to take a relatively long time, in single session. This could save a great deal of time for the observer.

A specimen on a stage, however, has a large microscopic observation area, and much effort has been needed to observe the specimen at many observation points appropriately switched and analyze the results.

SUMMARY OF THE INVENTION

In view of the problem described above, the present invention has been made. An object of the present invention is to provide a microscopic-measurement apparatus that makes it easy to observe a plurality of sites of the same specimen and to compare them with one another.

To achieve the foregoing object, the present invention provides a microscopic-measurement apparatus capable of displaying, on a display device, an enlarged image of a particular part of a specimen placed on a movable stage and providing optical information of a desired portion. The microscopic-measurement apparatus includes an observation image display section for displaying an enlarged image of a specific part of the specimen on the display device; a thumbnail-image display section for acquiring the enlarged image of the specific part as a thumbnail image when the enlarged image is specified and displaying the thumbnail image together with the enlarged image on the display device; a thumbnail-coordinate storage section for storing coordinate information of the specific part, where the thumbnail image is acquired, in association with the thumbnail image; and a thumbnail jump display section for causing the observation image display section to display an enlarged image of the position of the thumbnail image by specifying the thumbnail image.

It is preferred that the microscopic-measurement apparatus further include a target-mark display section for displaying a target mark on the enlarged image displayed by the observation image display-section, the target mark being capable of being moved relative to the enlarged image; an optical-information acquisition position storage section for storing coordinates of the current target mark display position in response to an optical-information acquisition position instruction; and an optical-information acquisition section for acquiring optical information by moving the movable stage to the optical-information acquisition position in response to an optical-information acquisition instruction.

It is further preferred that the thumbnail-image display section acquire a thumbnail image of the optical-information acquisition position and displays the thumbnail image on the display device.

It is also preferred that the microscopic-measurement apparatus further include a map image display section for displaying, on the display device, a map image corresponding to an area where the specimen can be placed on the movable stage; and a map jump display section for causing, in accordance with a position specified on the map image display section, the observation image display section to display an enlarged image of the position.

It is further preferred that the map image display section display the specific part, where the thumbnail image is acquired, on the map image.

It is also preferred that the microscopic-measurement apparatus further include a z-direction contrast display section for displaying a contrast in the depth direction of the specimen placed on the movable stage; and a focus change section for changing the focus of the enlarged image in the depth direction to a depth position specified on the displayed contrast in the depth direction.

The microscopic-measurement apparatus according to the present invention displays both thumbnail images of parts observed before and an enlarged observation image. When a thumbnail image is specified, the apparatus displays an enlarged image of the position corresponding to the specified thumbnail image, so that the past observation history can be checked very easily.

Because the thumbnail image of an optical-information acquisition position is obtained, the optical-information acquisition position can be easily confirmed.

DESCRIPTION OF THE PREFERRED EMBODIMENTS

A preferred embodiment of the present invention will be described below with reference to the drawings.

Figure 1:
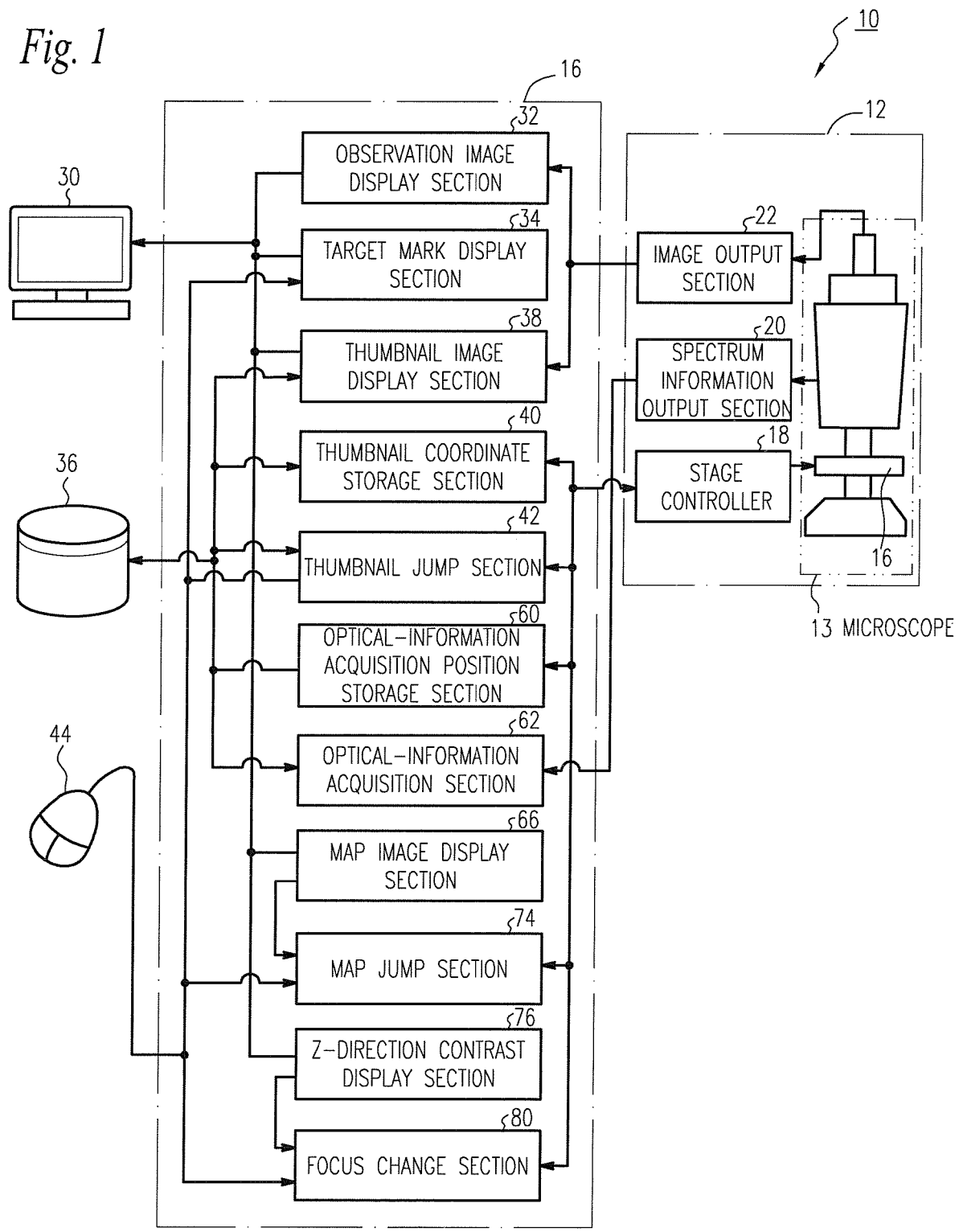
FIG. 1 is a block diagram showing the structure of a microscopic-measurement apparatus according to an embodiment of the present invention.

FIG. 1 shows an outline structure of a microscopic-measurement apparatus 10 according to an embodiment of the present invention.

The microscopic-measurement apparatus 10 shown in FIG. 1 includes a microscope block 12 and a control block 14 connected to the microscope block 12.

The microscope block 12 includes a microscope 13, a movable stage 16 for carrying a specimen placed in the microscope 13, a stage controller 18 for driving and controlling the movable stage 16, an image output section 20 for outputting an observed image, and a spectrum information output section 22 for outputting spectrum information of the specimen.

The control block 14 includes an observation-image display section 32 for displaying the observation image output by the image output section 20 on a display device 30, a thumbnail-image display section 38 for storing a selected observation image as a thumbnail image in a memory 36 and displaying it together with the observation image on the display device 30, a thumbnail-coordinate storage section 40 for storing the coordinates of the part of the specimen corresponding to the thumbnail image in the memory 36, and a thumbnail jump section 42. It is preferred that the control block 14 further include a target-mark display section 34 for displaying a target mark indicating a specific position on the observation image displayed by the observation-image display section 32, an optical-information acquisition position storage section 60, an optical-information acquisition section 62, a map image display section 66, a map jump section 74, a Z-direction contrast display section 76, and a focus change section 80.

Figure 2:
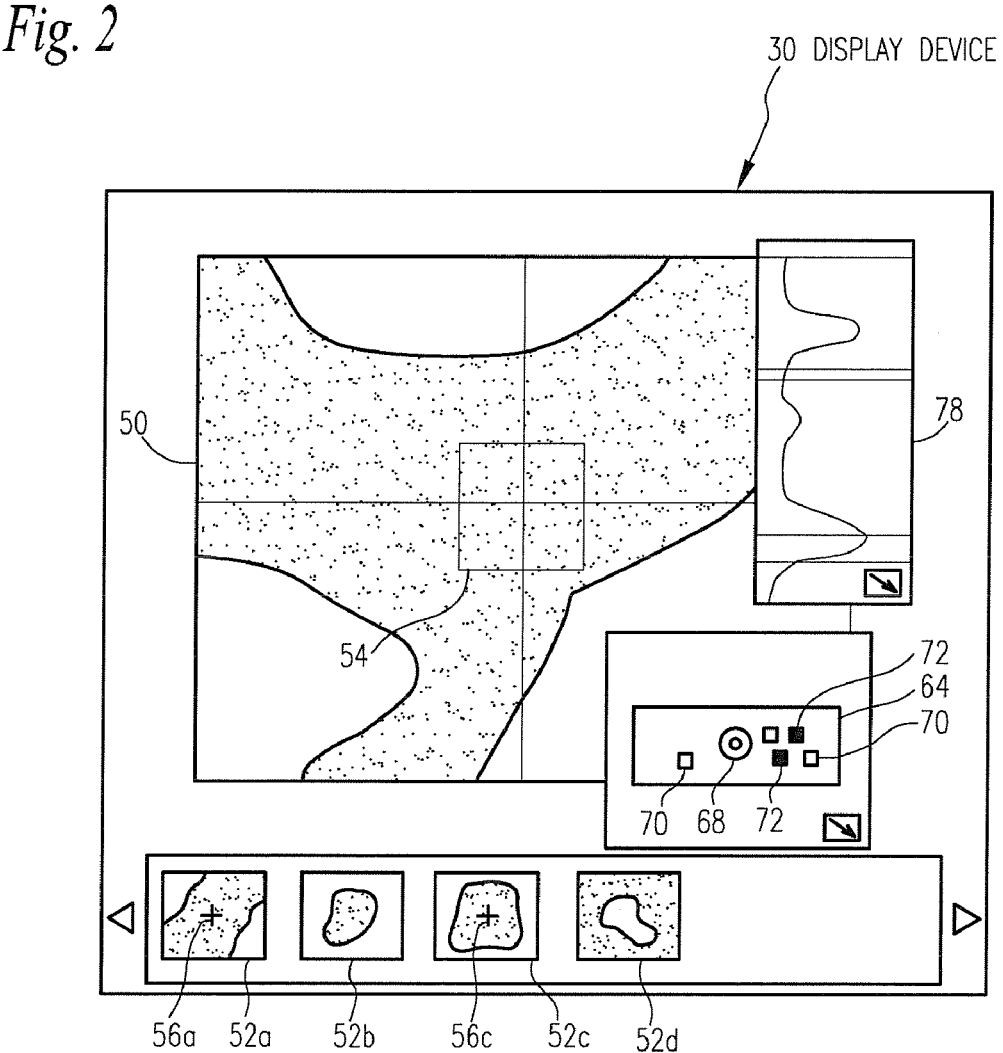
FIG. 2 illustrates images displayed by the apparatus shown in FIG. 1 on a display device.

FIG. 2 shows images displayed by the microscopic-measurement apparatus 10 of the embodiment on the display device 30. As shown in the figure, the display device 30 displays an enlarged observation image 50 in a large window and thumbnail images 52a, 52b, 52c, and 52d in a lower small window.

When the observation image 50 that is being displayed is selected by using a mouse 44 or a keyboard, which is not shown, or by performing a cursor operation on the display device 30, the thumbnail-image display section 38 obtains a reduced thumbnail image 52 and displays the image at a predetermined position, and the thumbnail-coordinate storage section 40 obtains the coordinate information from the stage controller 18 and puts the information into the memory 36 together with the thumbnail image 52.

If the thumbnail image 52 is specified by a cursor or the like while the movable stage 16 of the microscope block 12 is being operated to display the observation image 50 of a different position of the specimen, the thumbnail jump section 42 reads the coordinates corresponding to the specified thumbnail image 52 from the memory 36 and moves the movable stage 16 to display the current observation image 50 of the corresponding portion with a large magnification. This observation image can be stored as a large observation image when the thumbnail image is stored, and can be retrieved and replaced with or displayed together with the observation image then displayed.

Accordingly, the microscopic-measurement apparatus 10 of the embodiment can display, at any time, an observation image referenced before.

In the microscopic-measurement apparatus 10 of the embodiment, the target-mark display section 34 displays a target mark 54 on the observation image 50. As shown in FIG. 1, the control block 14 preferably includes the optical-information acquisition position storage section 60 and the optical-information acquisition section 62. The optical-information acquisition position storage section 60 stores the coordinates of the display position of a current target mark 54, in accordance with the optical-information acquisition position specified by the observer. The target mark 54 can be moved relative to the observation image 50 to any position.

The optical-information acquisition section 62 controls the spectrum information output section 22 to obtain optical information at the optical-information acquisition position, in accordance with an optical-information acquisition instruction.

In this embodiment, the optical-information acquisition position is specified by using the keyboard or a mouse button or by operating a switch on the screen by means of the cursor while the target mark 54 is placed at the optical-information acquisition position. To obtain optical information at a plurality of positions, the same operation is performed at those positions. Images obtained at the individual optical-information acquisition positions are shown as thumbnail images 52 together with the observation image. Quick target marks 56a and 56c are additionally displayed on the corresponding thumbnail images to indicate explicitly that the optical information is to be acquired there.

Like the optical-information acquisition position, the optical-information acquisition instruction is given by using the keyboard or a mouse button or by operating a switch on the screen by means of the cursor. The optical-information acquisition section 62 moves the movable stage 16 successively to the positions corresponding to those of the quick target marks 56 added on the thumbnail images 52, and controls the spectrum information output section 22 to obtain spectrum information at those positions.

Obtaining the spectrum information used to take a relatively long time. In this embodiment, however, all of the spectrum information can be obtained in one session. In addition, the individual acquisition positions can be confirmed easily because they are displayed on the thumbnail images 52, so that omission of any acquisition position can be avoided.

Moreover, a map image corresponding to the area where a specimen can be placed on the movable stage 16 can be shown on the display device 30.

The map image display section 66 shows a map image 64 on the display device 30. The position 68 of the current observation image, positions 70 where thumbnail images have been taken, and positions 72 where optical-information acquisition instructions have been issued are displayed on the map image 64.

When the cursor is moved to a desired position specified on the map image 64 by a mouse operation or the like and a click is made, the map jump section 74 moves the movable stage 16 to the corresponding position and displays an observation image 50 of the specified position on the display device 30.

The apparatus of the embodiment allows the observation history and optical-information acquisition positions of the whole specimen to be confirmed and enables movement to any position without a scroll operation of the observation image 50.

The Z-direction contrast display section 76 can specify the focus of the microscope 13 in the depth direction by specifying a position in a depth-direction contrast display window 78.

Each time a movement is made to any observation position, the movable stage 16 is moved in the vertical (Z) direction to detect the position of the specimen surface on the basis of variations in contrast, so that a clear image can be obtained by autofocusing.

The variations in contrast in different positions at each position in the depth direction of the specimen are displayed in the contrast window 78. When a desired position is specified in the window 78, the focus change section 80 controls the stage controller 18 to adjust the vertical position of the movable stage 16, so that an image at a desired depth can be observed, or the corresponding spectrum information can be obtained.

What is claimed is:

1. A microscopic-measurement apparatus capable of displaying, on a display device, an enlarged image of a particular part of a specimen placed on a movable stage and providing spectroscopic information of a desired portion, the microscopic-measurement apparatus comprising:

observation-image display means for displaying an enlarged image of a specific part of the specimen on the display device;

thumbnail-image display means for acquiring the enlarged image of the specific part as a thumbnail image when the enlarged image is specified and displaying the thumbnail image together with the enlarged image on the display device, said thumbnail-images indicating the specific parts where spectroscopic information will be obtained later;

thumbnail-coordinate storage means for storing coordinate information of the specific part, where the thumbnail image is acquired, in association with the thumbnail image;

thumbnail jump display means for causing the observation-image display means to display an enlarged image of the position of the thumbnail image by specifying the thumbnail image;

target-mark display means for displaying a target mark on the enlarged image displayed by the observation-image display means, the target mark being capable of being moved relative to the enlarged image;

optical-information acquisition position storage means for storing coordinates of the current target mark display position in response to an optical-information acquisition position instruction; and optical-information acquisition means for acquiring optical spectroscopic information by moving the movable stage to the optical-information acquisition position in response to an optical-information acquisition instruction.

2. A microscopic-measurement apparatus according to claim 1, wherein the thumbnail-image display means acquires a thumbnail image of the optical-information acquisition position and displays the thumbnail image on the display device.

3. A microscopic-measurement apparatus according to claim 1, further comprising:
   map image display means for displaying, on the display device, a map image corresponding to an area where the specimen is placed on the movable stage; and
   map jump display means for causing, in accordance with a position specified on the map image display means, the observation-image display means to display an enlarged image of the position.

4. A microscopic-measurement apparatus according to claim 3, wherein the map image display means displays the specific part, where the thumbnail image is acquired, on the map image.

5. A microscopic-measurement apparatus according to claim 1, further comprising:
   z-direction contrast display means for displaying a contrast in the depth direction of the specimen placed on the movable stage; and
   focus change means for changing the focus of the enlarged image in the depth direction to a depth position specified on the displayed contrast in the depth direction.

6. A microscopic-measurement apparatus according to claim 1, wherein when one thumbnail image is specified, the thumbnail jump display means reads coordinates corresponding to the specified thumbnail image from the thumbnail-coordinate storage means and moves the movable stage to display an observation image of the coordinates at the time when the thumbnail image is specified with a large magnification.

7. A microscopic-measurement apparatus according to claim 1, wherein the optical-information acquisition position storage means further storages coordinates of a plurality of target mark display positions and the thumbnail-image display means displays a plurality of target marks corresponding to the plurality of target mark display positions on the thumbnail images.

8. A microscopic-measurement apparatus according to claim 7, wherein the optical-information acquisition means moves the movable stage to positions corresponding to the plurality of target marks displayed on the thumbnail images and obtains spectroscopic information at the positions.

* * * * *

UNITED STATES PATENT AND TRADEMARK OFFICE
CERTIFICATE OF CORRECTION

| | | |
|---|---|---|
| PATENT NO. | : 7,954,069 B2 | Page 1 of 1 |
| APPLICATION NO. | : 12/117252 | |
| DATED | : May 31, 2011 | |
| INVENTOR(S) | : Yumoto et al. | |

It is certified that error appears in the above-identified patent and that said Letters Patent is hereby corrected as shown below:

In Column 5, Line 24, in Claim 1, delete "optical" (second occurrence).

Signed and Sealed this
Ninth Day of August, 2011

David J. Kappos
*Director of the United States Patent and Trademark Office*